US008195635B1

(12) United States Patent
Lee et al.

(10) Patent No.: US 8,195,635 B1
(45) Date of Patent: Jun. 5, 2012

(54) INDICATING RELATED BUT ABSENT MEDIA CONTENT

(75) Inventors: Woo Jae Lee, Manhattan, KS (US); Jonathan R. Kindred, Olathe, KS (US); Srinivasan Balaji Thenthiruperai, Prairie Village, KS (US); Jonathan Cooper Ochenas, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 484 days.

(21) Appl. No.: 11/951,743

(22) Filed: Dec. 6, 2007

(51) Int. Cl.
*G06F 17/30* (2006.01)

(52) U.S. Cl. ................. 707/706; 707/708; 707/913

(58) Field of Classification Search ........... 707/999.003, 707/999.01, 999.107, 769, 770, 706, 707, 707/708, 913–916
See application file for complete search history.

(56) References Cited

U.S. PATENT DOCUMENTS

| | | | | |
|---|---|---|---|---|
| 6,910,040 | B2* | 6/2005 | Emmick et al. ................. 1/1 |
| 7,363,649 | B2* | 4/2008 | Marsh ........................... 725/114 |
| 7,640,343 | B2* | 12/2009 | Scott, III ....................... 709/226 |
| 7,823,055 | B2* | 10/2010 | Sull et al. ...................... 715/201 |
| 2005/0015389 | A1* | 1/2005 | Novak et al. .................. 707/100 |
| 2005/0192987 | A1* | 9/2005 | Marsh ........................... 707/100 |
| 2006/0271516 | A1* | 11/2006 | Kortum et al. .................... 707/3 |
| 2006/0282789 | A1* | 12/2006 | Kim ............................... 715/764 |
| 2007/0005653 | A1* | 1/2007 | Marsh ......................... 707/104.1 |
| 2007/0112935 | A1* | 5/2007 | Espelien ....................... 709/217 |
| 2007/0154169 | A1* | 7/2007 | Cordray et al. ................. 386/83 |
| 2007/0248322 | A1* | 10/2007 | Hamada et al. ................. 386/95 |
| 2007/0276864 | A1* | 11/2007 | Espelien .................... 707/103 X |
| 2008/0104112 | A1* | 5/2008 | Nicholl et al. .............. 707/104.1 |
| 2008/0126418 | A1* | 5/2008 | Vignoli et al. ............. 707/104.1 |
| 2008/0147735 | A1* | 6/2008 | Sloo ............................ 707/104.1 |
| 2009/0138376 | A1* | 5/2009 | Smyers et al. .................. 705/27 |
| 2009/0177301 | A1* | 7/2009 | Hayes ............................. 700/94 |

OTHER PUBLICATIONS

"Conduits Community: Song Title Format How-To," http://conduits.com/community/printer_friendly_posts.asp?TID=511, Nov. 12, 2007, 8 pp.
"iPod FAQS: How can I remove missing tracks (with exclamation point icons)," http://www.ilounge.com/index.php/faqs/answers/how-can-i-remove-missing-tracks-with-exclamation-point-icons/, Nov. 12, 2007, 2 pp.

* cited by examiner

*Primary Examiner* — Thanh-Ha Dang

(57) ABSTRACT

Systems, products, and methods are disclosed for providing an indication of unavailable media products. An illustrative method includes referencing one or more attributes of a currently present media file, based on the attributes, determining a set of absent media files that are related to the present media file but not currently available for presentation via the device, and presenting indications of at least a portion of the absent media files of the set. An indication of one or more absent media files may be presented to a user so that the user may recognize absent media files. In one embodiment, such an indication may include an identifier, such as text or a symbol, that is positioned adjacent a media attribute that describes the absent media file.

16 Claims, 6 Drawing Sheets

INDICATING RELATED BUT ABSENT MEDIA CONTENT

SUMMARY

The present invention is defined by the claims below. But summarily, embodiments provide a way to indicate unavailable media files; or put another way, media content that a person does not own but that is available to be owned or media content that is not present on a particular computing device. Embodiments of the present invention have several practical applications in the technical arts including notifying a user of unavailable media files so that the user may easily recognize related media files that are unavailable. When we use the term "unavailable," we mean "presently unavailable," and are referring to content that is not present (absent) on a device, is related to content that is present on the device, and that is available to be put on the device by some way. Although sometimes, we may say "own," we generally mean that term to include "possess."

In a first illustrative aspect, a method (or product capable of carrying out a method) to indicate related media files that can be made available to a user. The method includes referencing one or more attributes of a currently present media file, based on the attributes, determining a set of absent media files that are related to the present media file but not currently available for presentation via the device, and presenting indications of at least a portion of the absent media files of the set.

In a second illustrative aspect, a method (or product capable of carrying out the method) includes referencing a set of related media attributes, which are attributes that are related to each other and are shared by a set of media files; referencing a set of descriptive information that describes a currently present file that is currently available to be presented by the device; utilizing the set of related media attributes and the set of descriptive information, determining one or more absent media files that are related to the currently present file; and presenting an indication of one or more of the absent media files.

In a third illustrative aspect, a method (or product capable of carrying out the method) includes receiving a media request, wherein the media request comprises a request for a media file; in response to the media request, identifying a media attribute describing the media file and referencing a set of media attributes related to the media attribute describing the media file; and outputting the set of media attributes.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. One embodiment takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
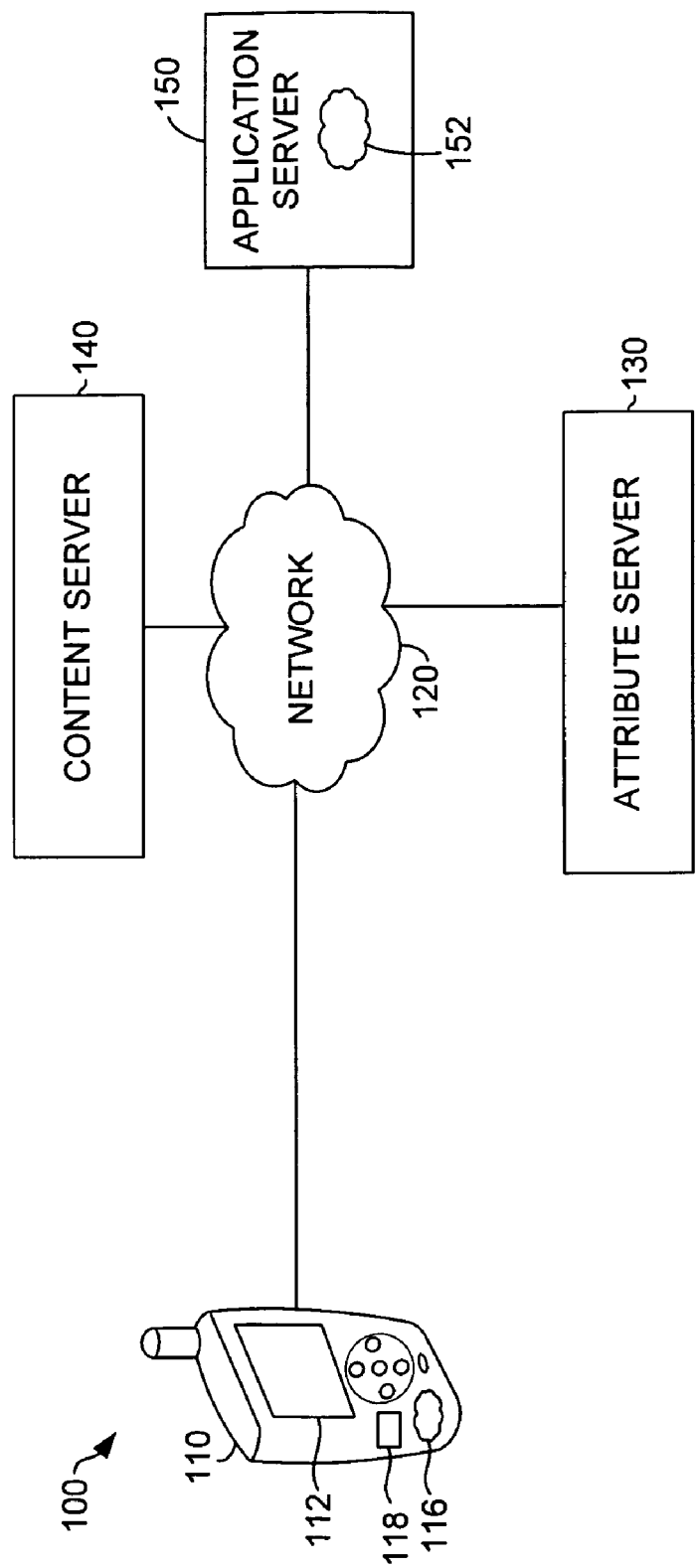
FIG. 1 depicts an illustrative computing system suitable for practicing an embodiment of the present invention.

Turning now to FIG. 1, an illustrative computing system suitable for practicing an embodiment of the present invention is provided and referenced generally by the numeral 100. A media-player device 110 includes a display 112, a power source such as a battery (not labeled), and a media-player application 116, which can take the form of computer-executable instructions in one embodiment. In one embodiment, a data store 118 is also included as part of media-player device 110. In other embodiments, media-player application 116 and data store 118 may be combined into a single component. Device 110 can also include other presentation component such as speakers for example.

As used herein, the phrase "media-player device" refers to any electronic device capable of presenting media files. As such, media-player device 110 may take on a variety of forms, such as a personal computer (PC), a laptop computer, a mobile phone, a personal digital assistant (PDA), a portable media player (PMP), or any other device that is capable of presenting media files as described herein. A portable media player (PMP) device may include, without limitation, a portable video player (PVP) and/or a digital audio player (DAP), such as an MP3 player. Accordingly, a media-player device 110 that is capable of presenting media files may be variously referred to herein as a media device, a portable media device, a portable media player, a media player, and the like. Makers of illustrative media devices include, for example, Research in Motion, Creative Technologies Corp., Samsung, Apple Computer, and the like. As will be explained in greater detail below, display 112 of media-player device 110 may, in some instances, present media attributes as well as an indication of unavailable media files.

Media-player application 116 enables the presentation of media files. A media file includes information available to a computer program utilized to present media. Media files may comprise digital or analog content including videos, songs, images, and the like. As such, a media file may include, for example, an audio media file, a video media file, an image media file, an animated media file, and the like. Media-player application 116 is compatible with one or more file formats. For example, media-player application 116 can be used to present audio files compatible with the MPEG-1 Audio Layer 3 (MP3) format, Windows Media Audio (WMA) format, Advanced Audio Coding (AAC) format, Waveform audio format (WAV), Ogg Vorbis format, Free Lossless Audio Codec (FLAC) format, Digital Radio Mondiale (DRM) format, and the like. Media-player device 110 can be used to present image media files and may support Joint Photographic Experts Group (JPEG) format, Graphics Interchange Format (GIF), Portable Network Graphics (PNG) format, and Tagged Image File Format (TIFF). Media-player device 110 used to present video media files may be compatible with the Moving Picture Experts Group (MPEG-4) format, Windows Media Video (WMV) format, Audio Video Interleave (AVI), DivX format, and Xvid format.

Media-player device 110 is capable of communicating with a communications network, such as network 120, in one embodiment. Network 120 may comprise, for example, cable networks, the Internet, wireless networks, or a combination thereof or portions thereof. In some embodiments, network 120 includes an array of devices, which are not shown so as to not obscure more relevant aspects of the invention. Components such as a base station, a communications tower, or even a WiFi access point (as well as other components) can provide wireless connectivity in some embodiments. Communications network 120 may include multiple networks, as well as being a network of networks, but is shown in more simple form so as to not obscure other aspects of the present invention. Network 120 enables communication between media-player device 110, attribute server 130, content server 140, and application server 150.

Attribute server 130 may include one or more media attributes. A media attribute, as used herein, refers to any characteristic associated with a media file. A media attribute may comprise, for example, a media title, a media size, a media length, a media artist, a media genre, a media album, a media format, a media performer, a media publisher, media lyrics, a media image, a media comment, and the like. One skilled in the art will recognize that any number of media attributes may be associated with a media file.

Attribute server 130 may organize, index, and/or store media attributes. Attribute server 130 may organize media attributes such that related media attributes are grouped together or reference each other. In one embodiment, attribute server 130 may include media files associated with the media attributes. In such a case, the media attributes may be stored within the media file. For example, ID3 enables information to be stored in a media file, e.g., an audio file. Alternatively, the media attributes may be stored external from the media file but, yet, within attribute server 130. In other embodiments, media files may be stored remotely from attribute server 130.

Content server 140 may include information regarding one or more available media files. In one embodiment, content server 140 may include available media files. In such a case, content server 140 may provide information regarding the media files contained therein or may permit other entities to access the media files to determine information regarding available media files. In some cases, at least a portion of the available media files comprise user-generated media files, user-uploaded media files, or a combination thereof. In one embodiment, the content server may comprise the server of an audio sharing website.

An available media file, as used herein, may refer to a media file that is available to a user, or group of users, such that the media file may be accessed and presented to the user. As such, user-generated media, user-uploaded media, and user-purchased media generally result in an available media file. On the other hand, a media file may be unavailable in instances where media file is corrupted; the media file has not been purchased; the media file, although purchased or possessed and stored on a computing device, is not present on a particular media-player device; and the like.

Application server 150 functions to identify unavailable media files. As more fully discussed below, such an identification may be made upon referencing available media-file information and media attributes information.

Computing system 100 is merely exemplary. While attribute server 130, content server 140, and application server 150 are illustrated as a single box, each can be separate and is also scalable. For example, each server 130, 140, and 150 may in actuality include several hundred servers in communication with each other. Moreover, attribute server 130, content server 140, and application server 150 may be combined into one or more servers. Any combination of attribute server 130, content server 140, and application server 150 may reside within media-player device 110 or another computing device to which media-player device 110 communicates. The single-unit depictions are meant for clarity, not to limit the scope of embodiments in any form.

As previously mentioned in the Summary, embodiments of the present invention provide an indication of unavailable media files. In some situations, a user may view a list of available media files but not recognize other related, but unavailable, media files. For example, assume a user navigates to view a list of songs available for a particular album. In such a case, the media-player device presents a list of available songs. The user, however, is not aware of the remaining songs in the album that the user does not have available. Accordingly, assuming the user desires to download the remaining songs, independent research may be required in order to determine the remaining songs in the album.

Figure 2:
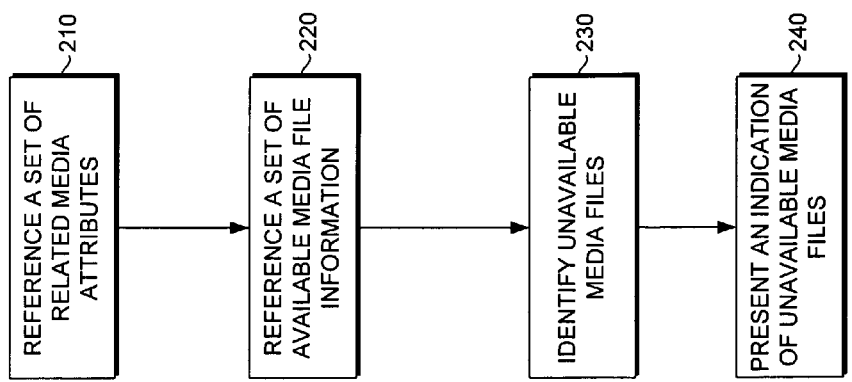
FIG. 2 depicts a block diagram of an exemplary computer system for indicating unavailable media files, in accordance with an embodiment of the present invention.

An embodiment of the present invention provides an indication of unavailable media files. With reference to FIG. 2, an illustrative method for providing an indication of unavailable media files will be described. At step 210, a set of related media attributes is referenced. Media attributes may be related based on any media aspect including, but not limited to, image content, video content, audio content, frame width, frame height, video sampling, artist data, track number, song title, pixel color depth, album, play list, genre, tags, image location, image folder, image time, or other logical, physical or other properties of the media file.

In embodiments, a set of related media attributes may be referenced by accessing related media attributes within a data store or, alternatively, receiving or retrieving a set of related media attributes from a data store. Such a data store may reside on a server hosting a content-notification application 152, such as application server 150, or may reside remotely from a server hosting a content-notification application 152, e.g., attribute server 130. Content-notification application 152 helps facilitate indicating content that is not present but that is available for obtaining. It notifies a user or a computing device of such content. In one embodiment, media attributes within a data store may be organized so that related media attributes are organized as a set. For example, media attributes comprising song titles may be related based on song album and, therefore, each song within a single album is related. In such a case, the related song titles may be stored as a set in a data store.

In another embodiment, media attributes within a data store may be organized so that related media attributes may be identified as related. For example, where song titles are related based on song album, although the related song titles may not be stored as a set, the related song titles may be indicated as such. For example, song titles may be identified as related within the data store by utilizing a field or identifier to indicate the album by which the songs are related.

In some embodiments, an application, such as a content-notification application, may determine a set of related attributes such that a set of related media attributes may be referenced. For example, in one case, media attributes may be stored in a data store, but not stored as a set of related media attributes or otherwise referenced as related. Rather, the media attributes stored in a data store may be stored in alphabetical order or based on a media identifier. In such a case, to reference a set of related media attributes, the content-notification application 152 may be configured to associate media attributes to identify a set of related media attributes, which may then be referenced. To associate related media attributes, content-notification application 152 may utilize an algorithm or a lookup system to determine related media attributes. Upon determining a set of related media attributes, the set of related media attributes may be dynamically referenced or stored for later reference.

A set of related media attributes may be referenced automatically or based upon an indication to reference a set of related media attributes. Referencing a set of related media attributes automatically, for example, may occur upon the occurrence of an event, e.g., the lapse of a specific time, the lapse of a specific duration, the initiation of media-player device or media-player application, and the like. Alternatively, a set of related media attributes may be referenced upon an indication to reference such media attributes. A user, a program developer or administrator, or any service provider may provide an indication to reference related media attributes. An indication to reference related media may include, for example, an indication to retrieve a media file, to organize media files, to view a media file, and the like. By way of example, assume a user requests to download, or otherwise access, a song. The user request may provide an indication to reference a set of media attributes related by album, artist, genre, or the like.

Upon referencing a set of related media attributes, at step 220, the content-notification application 152 references a set of available media-file information. A set of available media-file information may include a set of media files that are available or a set of information indicating the media files that are available, e.g., a list of songs for which media files are available. In one embodiment, a set of available media files or information associated therewith, may be organized by a media directory comprising a file or information hierarchy or indexing format for storing or accessing the set of available media files or associated information. Accordingly, available media-file information may be organized by related media attributes. In such a case, a set of available media-file information may comprise related media files or information pertaining to related media files. For example, assume song media attributes are related based on an album. As such, available media-file information associated with the album may be stored as a set, or otherwise indicated as related, such that content-notification application 152 may reference the related set of available media-file information. Alternatively, a set of available media-file information may comprise all media-file information for which corresponding media is available. For example, content-notification application 152 may reference an entire data store of available media files or associated information.

A set of available media-file information may be referenced automatically or based upon an indication to reference a set of available media files. Referencing a set of available media-file information automatically, for example, may occur upon the occurrence of an event, e.g., the lapse of a specific time, the lapse of a specific duration, the initiation of media-player device or media-player application, upon referencing a set of related media attributes, and the like. Alternatively, a set of available media-file information may be referenced upon an indication to reference such available media-file information. A user, a program developer or administrator, or any service provider may provide an indication to reference a set of available media-file information. An indication to reference a set of available media files may include an indication to retrieve a media file, to organize media files, to view a media file, to update media-file information, and the like. By way of example, assume a user requests to download, or otherwise access, a song. The user request may provide an indication to reference a set of available media-file information.

At step 230, one or more unavailable media files are identified. Unavailable media files may be identified, for example, by utilizing an algorithm or a look-up system. In one embodiment, content-notification application 152 may utilize the referenced set of related media attributes and the referenced set of available media-file information to identify unavailable media files.

Figure 3:
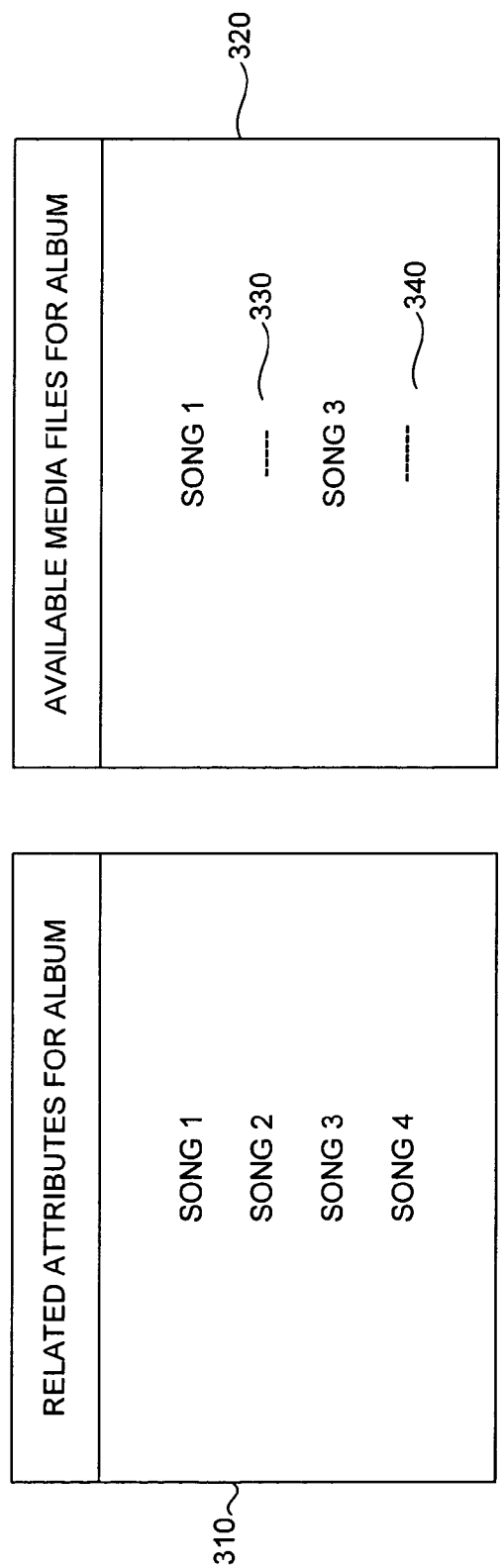
FIG. 3 depicts information utilized in determining unavailable media files, in accordance with an embodiment of the present invention.

By way of example, and with reference to FIG. 3, assume that song media attributes are related by album. Further assume that a set of related media attributes 310 and a corresponding set of available media-file information 320 are referenced. In such a case, an application may identify one or more unavailable media files by comparing the set of related media attributes 310 and the set of available media-file information 320. Accordingly, with respect to FIG. 3, it may be determined that "Song 2" 330 and "Song 4" 340 represent unavailable media files.

At step 240, content-notification application 152 facilitates presenting an indication of unavailable media files. An indication of unavailable media files may be presented in any manner including, but not limited to, text, values, symbols, icons, character formatting, audio, metadata, missing metadata, or any other manner that may indicate a media file is unavailable.

In one embodiment, an indication of unavailable media attributes may be presented to another system, server, or application. For example, assume content-notification application 152 resides on an application server. Upon identifying unavailable media files, the application may present an indication of unavailable media files to another computing device, such as a media-player device, capable of connecting to a media-player device, a server, or to a data store. Where an indication of unavailable media files may be presented to another device or data store, such unavailable media files, for example, may be tagged as unavailable or include metadata associated therewith.

Figures 4, 5:
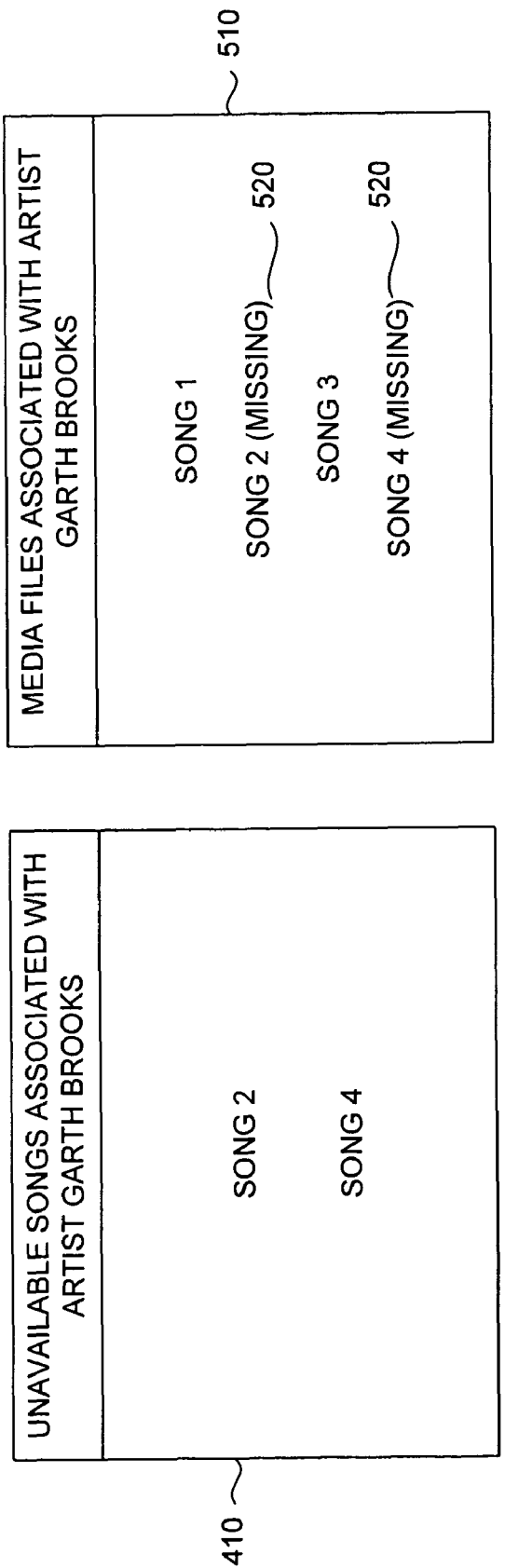
FIG. 4 depicts, in accordance with an embodiment of the present invention, a first presentation method for indicating unavailable media files.
FIG. 5 depicts a second presentation method for indicating unavailable media files, in accordance with an embodiment of the present invention.

In other embodiments, an indication of unavailable media files may be presented to a user by way of a user interface on a display of the media-player device. An indication of unavailable media files may also be presented by way of audio commands or even other touch-sensitive means such as vibrations to help people with visual impairments to be able to receive and understand feedback from the device. In presenting an indication of unavailable media files to a user, a list, chart, or other means may present media attributes to identify unavailable media files. For example, with reference to FIG. 4, assume a user navigates and selects to display unavailable audio media files associated with a particular artist, such as Garth Brooks. In such a case, a list 410 may be presented that indicates each Garth Brooks song for which an audio media file is unavailable. Such an indication may include the song title or any other song identifier that indicates an unavailable media file.

Alternatively, in presenting an indication of unavailable media files to a user, media attributes of both available media files and unavailable media files may be presented to a user. As such, an indication may be provided along with the unavailable media files to indicate that particular media files are unavailable. By way of example only, with reference to FIG. 5, assume a user navigates and selects to display media files associated with a particular artist, such as Garth Brooks. In such a case, a list 510 setting forth each song for which Garth Brooks is the artist may be presented to a user. In addition, an indication 520 of unavailable media files may also be presented. An indication 520 may, in some embodiments, be presented near or adjacent to the representation of the unavailable media file. One skilled in the art will recognize that presenting an indication of unavailable media files may, in application, comprise providing notification of available media files. Where notification of available media files is presented, an indication of unavailable media files may be recognized.

Figure 6:
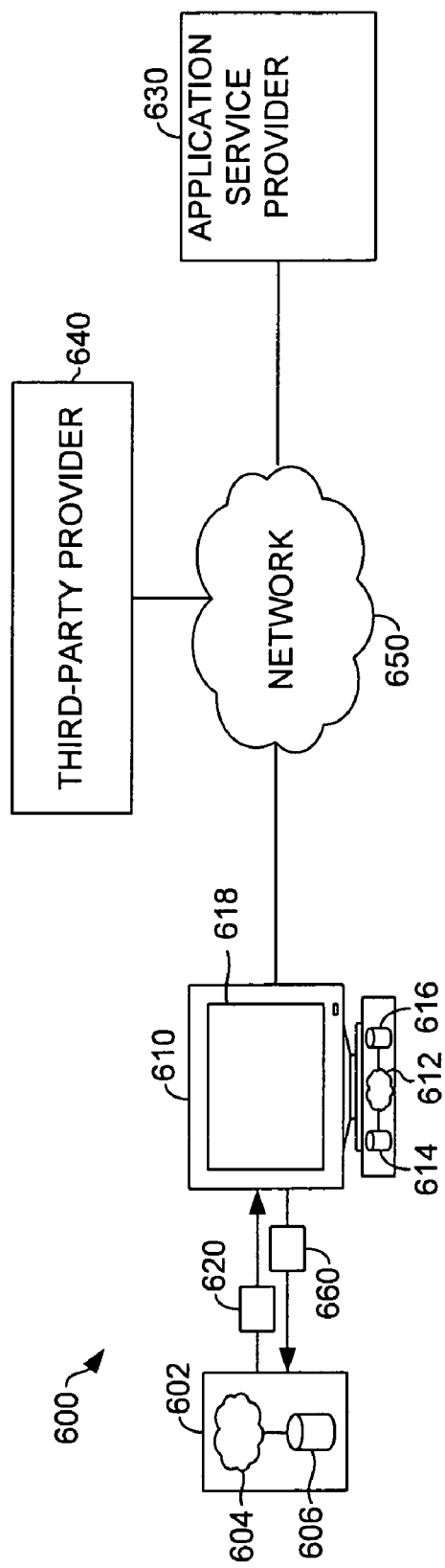
FIG. 6 depicts a first illustrative embodiment for presenting an indication of unavailable media files according to various embodiments of the present invention.

By way of example, with reference to FIG. 6, an illustrative operating environment suitable for practicing an embodiment of the present invention is provided and referenced generally by the numeral 600. As illustrated in FIG. 6, a media-player device 602 includes a media-player application 604 utilized to present media to a user and a data store 606. Such a media-player device 602 is capable of communicating with a computing device 610 hosting a content-notification application 612, one or more media attributes 614, and one or more available media-file information 616. One skilled in the art will recognize that computing device 610 may also include a media-player application utilized to store, among other things, media files and associated metadata and/or to present media to a user via a display screen 618. Illustrative media-player applications include, for example, Quicktime, iTunes, Winamp, VLC, MPlayer, xine, and Totem. In embodiments, a media-player application residing on computing device 610 and a content-notification application 612 may be combined into one application.

In operation, media-player device 602 communicates with computing device 610 to transfer media files and associated information between media-player device 602 and computing device 610 in one embodiment. As such, media-player device 602 provides a media request 620 to computing device 610. Media communication 620 can indicate a variety of things, such as a successful connection between media-player device 602 and computing device 610, a desire to organize media files or associated information, a desire to view media files or associated information, a desire to download one or more media files or associated information, and the like. Content-notification application 612 references a set of related media attributes and a set of available media-file information such that unavailable media files may be identified.

In one embodiment, related media attributes 614 and available media-file information 616 may be stored within computing device 610. In such an embodiment, computing device 610 may populate the data stores based on information from an application service provider 630, a third-party provider 640, or a combination thereof. Application service provider 630 may be associated with a media-player application and may store and provide media files. A third-party provider 640 may provide a database accessible via network 650 that includes media attribute information including, without limitation, media identifiers, mobile media identifiers, playlists, and the like. Illustrative application service provider 630 may include, for example, an iTunes provider. Illustrative third-party provider 640 may include, for example, Gracenote, Inc. By way of example, computing device 610 may obtain media attributes 614 by requesting media attributes from application service provider 630 and/or third-party provider 640. In embodiments, application service provider 630 may communicate with third-party provider 640, via network 650, to obtain media attributes.

Other implementations exist wherein the set of related media attributes and set of available media-file information may be stored in data stores remote from computing device 610. In such a case, content-notification application 612 may reference a set of related media attributes and a set of available media-file information from such remote data stores.

Upon referencing a set of related media attributes and a set of available media-file information, regardless of whether content-notification application 612 referenced the attributes and information internally or externally, content-notification application 612 may utilize such attributes and information to determine unavailable media files. After determining unavailable media files, computing device 610 may present an indication 660 of one or more unavailable media files to media-player device 602. In an embodiment where media request 620 comprises a request to download a particular song, computing device 610 may incorporate the indication 660 of one or more unavailable media files within metadata (or other descriptive information) associated with the media file that computing device 610 transfers to media-player device 602. The indication 660 may include, for example, metadata comprising, among other things, a set of related attributes with unavailable media files uniquely identified.

After obtaining an indication 660 of one or more unavailable media files, media-player device 602 may present an indication of the one or more unavailable media files via a user interface. Presenting an indication via a user interface may occur upon obtaining the media file and associated information or upon a user navigating to select, play, organize, and the like. While the media-player device 602 may display an indication of unavailable media files to a user, a media-player application residing within computing device 610 may also be utilized to display an indication of unavailable media files to a user, notwithstanding any communication with media-player device 602. One skilled in the art will recognize that content-notification application 612 may reside within any server or computing device, such as, for example, media-player device 602, application service provider 630, and/or third-party provider 640.

Figure 7:
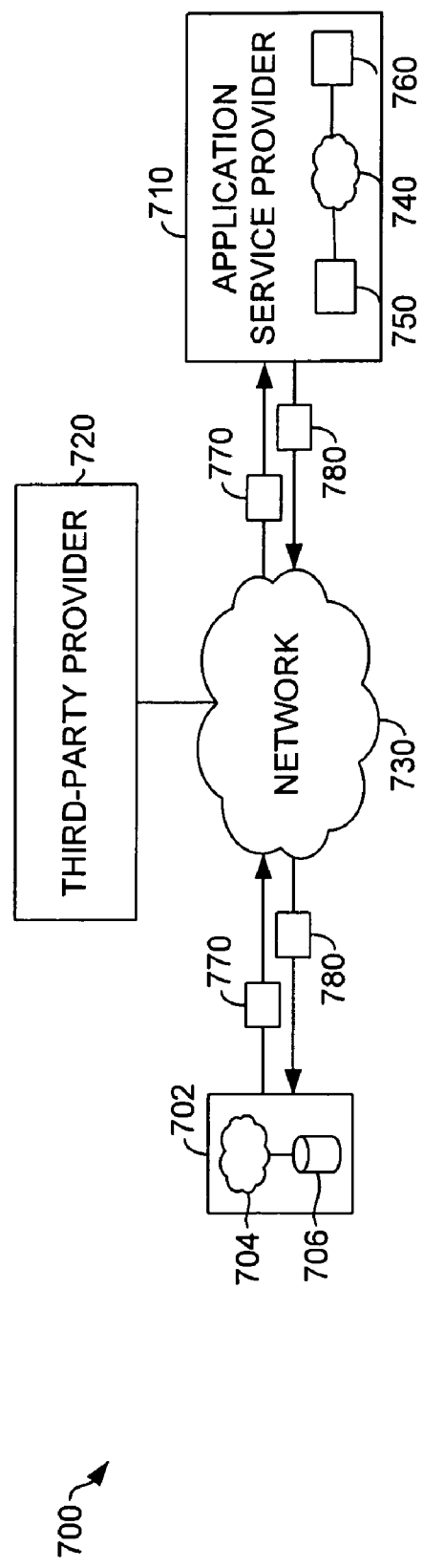
FIG. 7 depicts a second illustrative embodiment for presenting an indication of unavailable media files according to various embodiments of the present invention.

By way of further example, with reference to FIG. 7, an illustrative operating environment suitable for practicing an embodiment of the present invention is provided and referenced generally by the numeral 700. FIG. 7 illustrates an operating environment where a portable media-player device communicates directly with an application service provider 710 via a network, rather than communicating with another computing device that communicates with the application service provider 710. As illustrated in FIG. 7, a media-player device 702 includes a media-player application 704 utilized to present media to a user and a data store 706 utilized to store, for example, media files and associated metadata. Such a media-player device 702 is capable of communicating with an application service provider 710 and/or a third-party provider 720 over a network 730. In one embodiment, application service provider 710 may include a content-notification application 740, one or more media attributes 750, and one or more available media files 760.

In operation, media-player device 702 may communicate with application service provider 710 to transfer media files and associated information between media-player device 702 and application service provider 710. As such, in one embodiment, media-player device 702 may provide a media communication 770 to application service provider 710. Media communication 770 may indicate a successful connection between the media-player device 702 and application service provider 710, a desire to organize media files or associated information, a desire to view media files or associated information, a desire to download one or more media files or associated information, and the like. Upon application service provider 710 receiving media communication 770, rather than immediately providing media-player device 702 with a requested media file and associated standard metadata, content-notification application 740 may reference a set of related media attributes and a set of available media-file information such that unavailable media files may be identified and presented to media-player device 702.

In one embodiment, related media attributes 750 and available media-file information 760 may be stored within application service provider 710. In such an embodiment, application service provider 710 may populate the data stores based on information provided to or provided from media-player device 702, a third-party provider 720, or a combination thereof. A third-party provider 720 may provide a database accessible via network 730 that includes media attribute information including, without limitation, media identifiers, mobile media identifiers, playlists, and the like. By way of example, application service provider 710 may obtain media attributes 750 by requesting media attributes from third-party provider 720. In embodiments, application service provider 710 may communicate with third-party provider 720, via network 730, to obtain media attributes. Application service provider 710 may obtain available media-file information 760 by communicating with media-player device 702. For example, media-player device 702 may provide available media-file information to application service provider 710. Alternatively, application service provider 710 may obtain available media-file information based on a media request for a media received from media-player device 702 or based on media files provided to media-player device 702.

Other implementations exist wherein the set of related media attributes 750 and set of available media-file information 760 may be stored in data stores remote from application service provider 710. In such a case, content-notification application 740 may reference a set of related media attributes 750 and a set of available media-file information 760 from such remote data stores.

Upon referencing a set of related media attributes 750 and a set of available media-file information 760, regardless of whether content-notification application 740 referenced the attributes and information internally or externally, content-notification application 740 may utilize such attributes and information to determine unavailable media files. After determining unavailable media files, application service provider 710 may present an indication 780 of one or more unavailable media files to media-player device 702. In an embodiment where media request 770 comprises a request to download a particular song, application service provider 710 may incorporate the indication 780 of one or more unavailable media files within metadata associated with the media file that application service provider 710 transfers to media-player device 702. The indication 780 may include, for example, metadata comprising, among other things, a set of related attributes with unavailable media files uniquely identified. Although an indication 780 of one or more unavailable media files may be provided within metadata associated with a requested media file, the indication 780 may, similarly, be provided to media-player device 702 independently of the media file and in response to any media request. In one embodiment, content-notification application 740 may be configured to present an indication of unavailable media files regardless of a media communication. For example, content-notification application 740 may provide an indication of unavailable media files one time per week.

After obtaining an indication 780 of one or more unavailable media files, media-player device 702 may present an indication of the one or more unavailable media files via a user interface. Presenting an indication via a user interface may occur upon obtaining the media file and associated information or upon a user navigating to select, play, organize, and the like. One skilled in the art will recognize that content-notification application 740 may reside within any server or computing device, such as, for example, media-player device 702 and/or third-party provider 720.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A non-transitory computer-readable medium having computer-useable instructions embodied thereon which, when executed by a processing unit of a device, configure the device to perform a method for indicating absent media files comprising:
   retrieving, by the device, a first media list comprising at least one present media file, wherein the present media file is a file currently available for presentation by the device, and wherein the retrieving of the first media list is based on information provided by a user request;
   retrieving, by the device, after the retrieving of the first media list, at least one attribute of the at least one present media file;
   determining, by the device, a set of absent media files related to the at least one present media file, wherein an absent media file is a file not currently available for presentation by the device, and wherein the determining is based on a retrieved attribute of the at least one present media file; and
   presenting, by the device, a second media list comprising the set of absent media files and indications identifying the absent media files.

2. The non-transitory computer-readable medium of claim 1, wherein the absent media file comprises a media file that is stored remotely from the device.

3. The non-transitory computer-readable medium of claim 1, wherein the at least one attribute comprises media titles related based on one of artist, album, and genre.

4. The non-transitory computer-readable medium of claim 1, further comprising identifying media attributes relating to the at least one present media file and the absent media files.

5. The non-transitory computer-readable medium of claim 4, wherein identifying the media attributes relating to the at least one present media file and the absent media files comprises referencing the media attributes relating to the at least one present media file and information related to the media attributes from the at least one media file.

6. The non-transitory computer-readable medium of claim 1, wherein the at least one present media file comprises at least one of an audio file, a video file, an animated media file, and an image file.

7. A method for indicating absent media files comprising:
  receiving, by a device, a media request comprising a request for a media file;
  retrieving, by the device, a first list comprising a set of media attributes that are related to at least one media attribute of the requested media file and are shared by a set of media files, when the requested media file is currently available for presentation by the device;
  retrieving, by the device, a set of descriptive information comprising a description of the requested media file, when the requested media file is currently available for presentation by the device;
  determining, by the device, at least one absent media file related to the requested media file, wherein an absent media file is a file not currently available for presentation by the device, and wherein the determining is based on at least one attribute of the retrieved set of media attributes; and
  presenting, by the device, a second list comprising the at least one absent media file and indications identifying the absent media files.

8. The method of claim 7, wherein the set of media attributes is described by metadata, and wherein the set of media attributes are related to the at least one media attribute of the requested media file based on at least one of an album, a series, an artist, a producer, a release time-frame, and a genre.

9. The method of claim 8, wherein the metadata comprises metadata of a media file.

10. The method of claim 9, wherein a tagging scheme is used to incorporate the metadata within the media file, and wherein the tagging scheme is consistent with at least one of embedding ID3 tags and EXIF (exchangeable image file format) tags.

11. The method of claim 7, wherein the set of descriptive information further comprises a set of media files.

12. The method of claim 7, wherein the set of descriptive information is stored within a computing device that hosts a media-player application.

13. The method of claim 7, wherein determining the at least one absent media file comprises comparing the set of media attributes to the set of descriptive information to recognize each of the media attributes within the set of media attributes not associated with the requested media file.

14. The method of claim 7, wherein presenting the at least one absent media file comprises presenting an indication of the at least one absent media file on a display of the device.

15. The method of claim 14, wherein the indication comprises at least one of a text, a value, a symbol, and an icon.

16. The method of claim 15, wherein the presenting the at least one absent media files further comprises including an indication of unavailability of the at least one absent media file.

* * * * *